United States Patent [19]
Elkins et al.

[11] 3,832,735
[45] Sept. 3, 1974

[54] FLEXIBLE JOINT FOR PRESSURIZABLE GARMENT

[75] Inventors: William Elkins, Canoga Park; Eugene W. Connell, Thousand Oaks; Robert E. Alesna, Torrance, all of Calif.

[73] Assignee: The United States National Aeronautics and Space Administration Under the Provisions of 42 U.S.C. 2457, Washington, D.C.

[22] Filed: Dec. 11, 1967

[21] Appl. No.: 689,455

[52] U.S. Cl............................ 2/2.1 A, 2/82, 156/218
[51] Int. Cl........................................... A62b 17/00
[58] Field of Search .............. 2/2.1, 2.1 A; 156/218

[56] References Cited
UNITED STATES PATENTS

| 2,392,992 | 1/1946 | Martin | 2/2.1 X |
| 3,242,499 | 3/1966 | Fonda-Bonardi | 2/2.1 |
| 3,400,741 | 9/1968 | Robinson et al. | 156/218 |

FOREIGN PATENTS OR APPLICATIONS

| 891,998 | 3/1962 | Great Britain | 2/2.1 |
| 954,988 | 4/1964 | Great Britain | 2/2.1 |

Primary Examiner—Verlin R. Pendegrass
Attorney, Agent, or Firm—Marvin J. Marnock; Neil B. Siegel; John R. Manning

[57] ABSTRACT

A flexible joint for a pressurizable garment has two fabric layers bonded together. The lay of one layer is straight cut and the other of bias cut. A ring-like tension member covered with Teflon disposed at the minor diameter of each joint convolution, is unrestrained other than being retained thereat in the flexure plane. A compression ring is secured at the major diameter, at certain of the convolutions, preferably alternate ones. A pair of axially disposed cable joint restraints at the convolution periphery are disposed in a plane normal to the flexure plane.

15 Claims, 12 Drawing Figures

INVENTORS
WILLIAM ELKINS
EUGENE W. CONNELL
BY ROBERT E. ALESNA

Orville R. Seidner
AGENT

FLEXIBLE JOINT FOR PRESSURIZABLE GARMENT

ORIGIN OF INVENTION

The invention described herein was made in the performance of work under a NASA contract and is subject to the provisions of Section 305 of the National Aeronautics and Space Act of 1958, Public Law 85-568.

BACKGROUND OF THE INVENTION

A pressurizable garment presents problems to the wearer, not the least of which is the requirement of mobility, as realized by the need for flexion and extension of the joints of the elbow, knee and the like. The limbs forming these joints need to execute at least minimum angles in a flexure plane, if the wearer of the garment is to walk and perform work tasks while encased in the garment, and the pressurization of the interior of the garment above that of the existing atmosphere and space makes almost absolute the requirement that the joints of the garment operate substantially in a constant volume mode. That is, when a joint is flexed the volume encompassed by that portion of the garment should remain substantially constant, else the bending moment for the joint becomes almost prohibitive, and walking, for example, would be exhaustive. The problem has been solved to some extent in the prior art by the provision of convoluted joints. In a known joint, for example, the garment fabric is convoluted about a peripheral major diameter of about 7.57 inches with the folds of the convolutions extending radially inwardly to a minor diameter of about 6.25 inches.

Adjacent successive folds are about 0.586 inches apart along the axis of the joint.

The inwardly directed folds are secured in that convolution by rings or cords on the minor diameter. The joint structure usually includes a pair of axial restraint cables secured on the inside of the joint at each minor diameter point on a plane normal to the flexure plane.

As a consequence of this structural arrangement, each convolution of the joint can flex to a practical maximum of approximately ±8.31° in the flexure plane, but it should be noted that it requires a moment of about 58.4 inch-pounds about the center of pressure to flex the convolution by this amount when it is pressurized by an internal pressure of 5 pounds per square inch gauge.

It is apparent that such a structure is similar to a conventional convoluted bellows having an arcuate cross section at the periphery of each convolution. As such a joint is flexed, the arcuate section becomes increasingly large at the extension side of the flexure plane and correspondingly smaller at the contraction side. Since the cross sectional area varies as the square of the radius, a non-equal volume change occurs in the convolutes contributing to instability of the joint when flexed.

The pressure joint disclosed herein is designed so that the convolute section closely approximates a flat sided cylindrical element. With this configuration there is negligible volume change as the joint is flexed.

Contrasted with the prior art structure is that of the present invention which likewise provides a substantially constant volume joint, as noted above, but within a major diameter of about 6.84 inches. Each convolution of the joint, according to the present invention is capable of flexion to a practical maximum of about ±8.99° with an applied joint flexing moment of about 2.00 inch-pounds. Hence, it can be seen that the joint about to be described constitutes a substantial advantage over those of the prior art, and it will become apparent that the overall advantage over known structures is the sum total of several individual structural features, each of which contributes its own important and significant advantage to the joint taken as a whole.

It is to be noted that no order of importance is to be implied from the order in which the various novel features is taken up in describing the novel joint.

SUMMARY

According to the present invention, each of the convolutions of the joint is formed with peripheral portions extending substantially axially of the joint, merging with folded portions extending substantially radially toward the axis. The convolutions are formed with a rather sharp 90° bend at the merger of the portions, with the peripheral portions preferably having a length twice that of each adjacent radially directed folded portion, thus providing a convoluted structure which flexes to the maximum possible angle of flexure.

In the fabrication of such a structure, it was found that buckling of the fabric in the folded portions as a consequence of curving it about the axis of the joint and at the same time directing it radially toward and from the axis, could be minimized by forming a joint of a plurality of fabric strips joined by fabric overlap with the joined edges parallel to the joint axis. Furthermore, it was discovered that the effort to flex the joint was markedly reduced by orienting the lay of the fabric strips with a straight cut along the axis, and that best results were had with the fabric fill threads parallel to the axis. Supplementary to this, it was found that the best structure in the case of a two layer arrangement was as aforesaid for the outer layer, and a bias cut lay for the fabric of the inner layer of the joint.

As an incidental note, it will be observed that a preferred one of a group of known fabrics for pressurized garments is woven of Nomex material having a thread count of 80 by 80. The fabric is supplied by the manufacturer with a thin coat of neoprene bonded to one surface, which acts as a pressure sealant and at the same time is at least as flexible and pliable as the garment fabric to which it is applied.

In the case of pressurized garment joints, an axial restraint is required, and according to the present invention a pair of flexible restraint cables are externally disposed adjacent the joint in a plane normal to the flexure plane of the joint. The cables are each attached to the end members of the joint and may also be secured to one or several or all of the convolutions at their peripheral portions at points intermediate the radial folded portions. As will be brought out below, this arrangement provides a distinct improvement over flexible joints of the prior art.

As is known, a tension restraint ring or the like is required at the minor diameter of each of the convolution folds. As a consequence, in the present invention, the ring restraints, whether of rigid wire or of flexible cord, are disposed within a tube or channel coated by a material such as Teflon which offers a low coefficient of friction to the fabric material of the convolutions. Furthermore, the restraint rings are relatively flexible for movement with respect to the convolution fabric, but only within the confines imposed by retainers disposed at points in the folds of the convolutions substantially solely in the flexure plane of the joint.

In the development of the joint according to the present invention, it was found that the peripheral portions of the convolutions had a tendency to tuck and fold inwardly, and to buckle, thus departing from the desired joint configuration. Furthermore, any buckling of the convolution fabric results in just that much more effort to flex the joint, hence is not desirable from that standpoint, as well as considerations of wear-and-tear on the fabric at the buckling points. The problem presented was overcome by securing a rigid compression ring member of narrow section on the interior of the peripheral convolution portions intermediate the radially folded portions. As a practical matter, it was found that such a ring member is desirable only within alternate convolutions.

BRIEF DESCRIPTION OF THE DRAWINGS

Referring to FIGS. 1 and 2, a knee joint member 20 of a pressurizable garment (not shown) is shown as disposed between upper and lower leg enclosure members 22 and 24 of the garment. It will be observed in FIG. 1 that the joint member 20 is illustrated in a partially flexed position by reason of the upper and lower legs of the wearer of the garment being flexed in an angle of about 30° to 40° in the flexure plane designated at 26 in FIG. 2. In its normally neutral or unflexed position, the member 20 is of generally tubular configuration disposed about an axis which lies in the flexure plane 26. The upper and lower leg members 22 and 24 are likewise usually of a tubular configuration.

Figure 1:
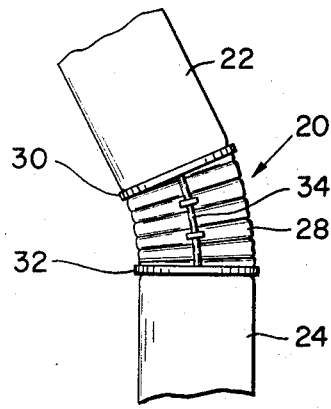
FIG. 1, is a side elevation view, somewhat schematic in form, of the knee joint of a pressurized garment, according to the present invention, with the joint shown in partially flexed position.

The joint 20 is comprised of a convoluted member 28 disposed between ring-like assemblies 30 and 32, which serve to join the member 20 with the members 22 and 24 in a pressure tight seal. Axial restraint assemblies 34 and 36 secure the ring-like assemblies 30 and 32 in axially spaced relationship, while at the same time permitting flexure of the joint in the flexure plane.

Figure 2:
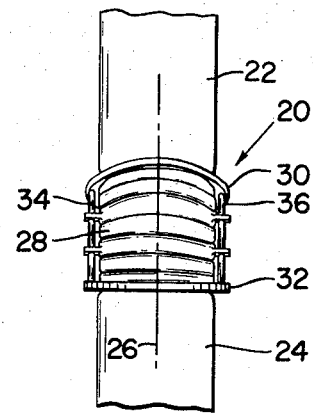
FIG. 2, is a front elevation view of the knee joint shown in FIG. 1.
Figure 3:
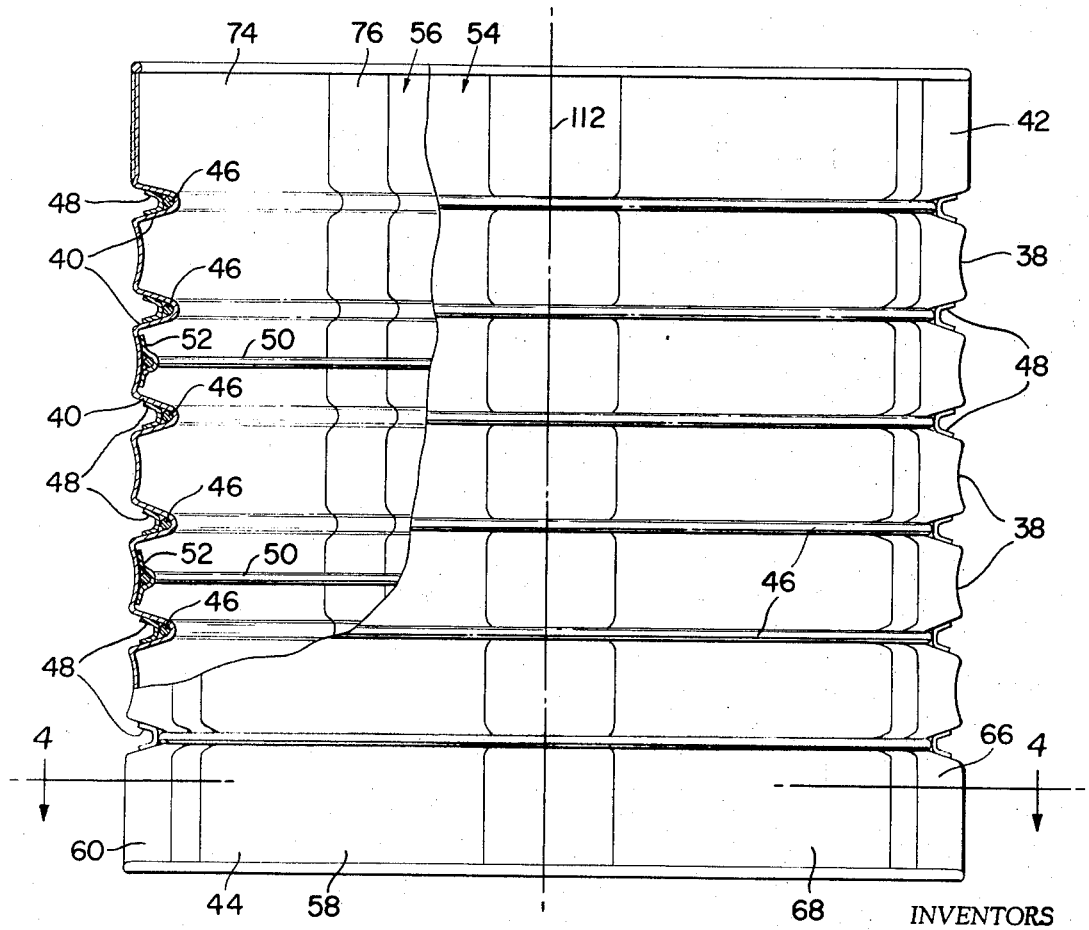
FIG. 3, is an elevation view, partially broken-away, showing the convoluted fabric portion and circumferential restraints of which the joint is comprised.

Referring to FIG. 3, the convoluted member 28 is seen in its formed and axially unrestrained condition and as comprising a plurality of convolutions, each of which is formed with a peripheral portion 38 and inwardly folded portions 40. End portions 42 and 44 are arranged to be clamped by the ring-like assemblies 30 and 32 of FIGS. 1 and 2 as will be hereinafter described. As seen in FIG. 3, the peripheral portions 38 are slightly concave in curvature in their formed condition. However, when the joint is assembled and pressurized with the convoluted member 28 between the ring-like assemblies 30 and 32, and with axial restraint assemblies 34 and 36 applied, adjacent folded portions 40 close together and the curves in the peripheral portions 38 disappear substantially. As a consequence, in the utilization condition, the peripheral portions 38 then extend substantially axially while the folded portions 40 are disposed substantially radially.

Circumferential restraints 46 to enable the convolutions to be retained in the form described, are disposed on the exterior surface of the member 28 at the minor diameter of each of the convolutions as defined by the folded portions 40. Restraints 46 are ring-like members which may take the form of a rigid metal ring, for example, or may be tied filaments or cords of a material strong enough to withstand the tension forces involved. Each of the restraints 46 are retained in position by a pair of narrow fabric retainers 48 diametrically disposed in the flexure plane of the member 28. The retainers 48 may, for example, overlap the restraints 46 for a circumferential distance of about 0.12 inches. This arrangement has been found to be importantly desirable in that flexion of the convoluted member was found to result in some relative sliding movement as between the restraints 46 and the fabric comprising the folded portions of the convolutes, in particular in the areas generally adjacent the axial restraints 34 and 36.

Because of the relative sliding movement experienced as mentioned, it was found that the friction between the restraints and fabric contributed somewhat to the bending moment of the joint. A solution to this problem was found by interposing a material of low friction coefficient between the restraint and the fabric. In the case of a rigid material restraint ring, the ring may be provided with a Teflon dispersion coat. If the restraint is a cord, it may likewide be coated or it may be encased in a thin Teflon tube.

Disposed within the convoluted member 28 are compression rings 50 secured to the inner surface of the peripheral portions of alternate convolutions. The rings 50 prevent buckling or tucking-in of the peripheral fabric when the joint is flexed. The rings 50 are secured intermediate successive folded portions 40 by fabric retainers 52 which may be similar to retainers 48 for the restraints 46. The retainers 52 are likewise disposed in the general area of the flexure plane, although this location is not as critical as is the case for the retainers 48.

As has been indicated, the convoluted member 28 is comprised of a woven fabric material which must be proof against fluid leakage when a pressure differential exists across the face surfaces. Desirably, then, a continuous fabric structure is preferable and particularly so at bends and folds which will be subject to flexing when the member 28 is in use in a pressurized garment. However, the fact of convoluting the fabric into peripheral and folded portions 38 and 40 is incompatible to curving it about an axis to form a generally tubular member.

Figure 4:
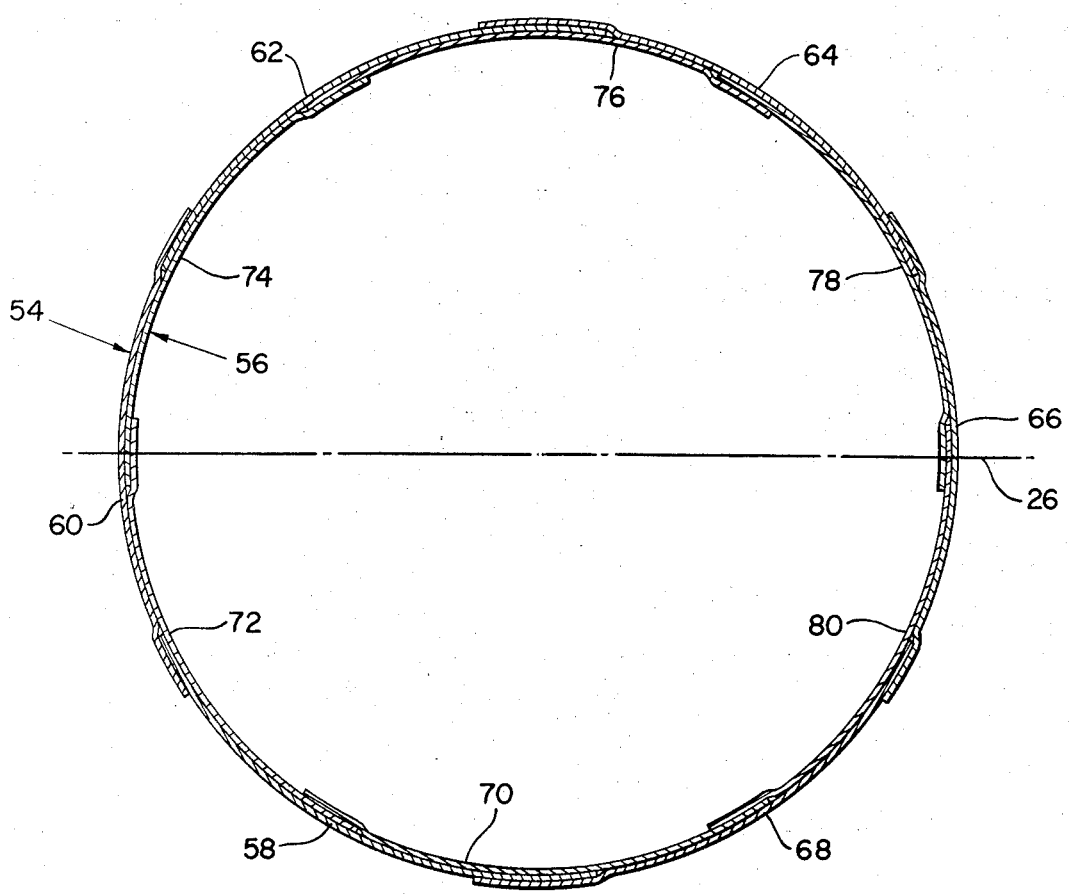
FIG. 4, is a plan view in cross-section, taken on the line 4—4 of FIG. 3.

The problem is solved according to the present invention by forming the convoluted members of a plurality of elongate fabric strips joined edge to edge in overlapping relationship. As seen in FIGS. 3 and 4, the member 28 comprises outer and inner tubular members 54 and 56, which are formed as aforesaid, the members being bonded together to provide a unitary pressure tight member.

The outer tubular member 54 is comprised preferably of six elongate fabric strips 58, 60, 62, 64, 66 and 68. The inner tubular member 56 is also comprised of six elongate strips 70, 72, 74, 76, 78 and 80. As supplied by the manufacturer, the fabric is provided with a coating of uncured neoprene on one surface. In the case of the outer member 54, the strips are laid up with the coating facing inwardly. The coating of the strips on the inner member 56 faces outwardly, and when the final assembly of strips is cured the two coats bond together in a pressure sealant bond between the fabrics comprising the outer and inner tubular members 54 and 56.

It should be noted that the thickness total of the two layers of the fabric, together with the sealant bond between, usually does not exceed about 0.020 inches, hence the illustrations in the various figures of the drawings in which the sections of the fabric are shown are greatly exaggerated for illustrative purposes only.

In the fabrication of the convoluted member 28, a cylindrical mandrel with a periphery corresponding to the peripheral portions 38 and circumferential slots corresponding to the folded portions 40 is utilized. Elongate strips 70, 72, 74, 76, 78 and 80 are then laid on the mandrel with the fabric side facing the axis to form the member 56. Thereafter, elongate strips 58, 60, 62, 64, 66 and 68 are laid fabric face out on the other strips to form the member 54, and it will be observed in FIG. 4 that the overlapping edge joints of members 54 and 56 alternate with each other. As the various strips are laid on the inwardly directed folded portions 40 are formed simultaneously, and in that way only a very minimum amount of squeezing and a minor amount of buckling of the fabric occurs in the portions directed radially toward the minor diameters of the slots for the folded portions.

It should be noted that in experimenting with the laying up of the fabric in developing the invention and reducing it to actual practice, it was discovered that a not inconsiderable reduction of bending moment for the flexible joint was to be had if one of tubular members 54 and 56 was found with the lay of the fabric straight cut along the axis of the member and more particularly so if the lay of the fabric was such that the fill threads were parallel to the axis and the warp threads circumferentially disposed. This weave orientation was found to be important to provide circumferential restraint as a means of preventing ballooning of the convolutes.

Preferably, the lay of the fabric of the inner tubular member 56 is bias cut which appears to reduce the bending moment effort. Also preferably, the outer layer of the tubular member 54 is the one with the straight cut fabric orientation.

Figure 5:
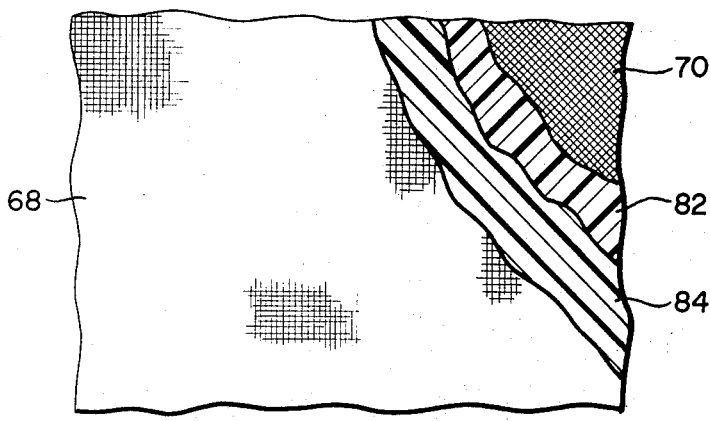
FIG. 5, is a fragmentary enlarged view of the laminar fabric arrangement comprising the joint structure.

The preferred orientation of the fabric and bonding layers is illustrated in FIG. 5, wherein the inner fabric layer of the strip 70, for example, has its outwardly facing coating 82 of uncured neoprene laying against the inwardly facing coating 84 on the outer fabric strip 68. It will be seen that the fabric lay of strip 68 is straight cut while that of strip 70 is bias cut, all as described in detail hereinabove.

Figure 6:
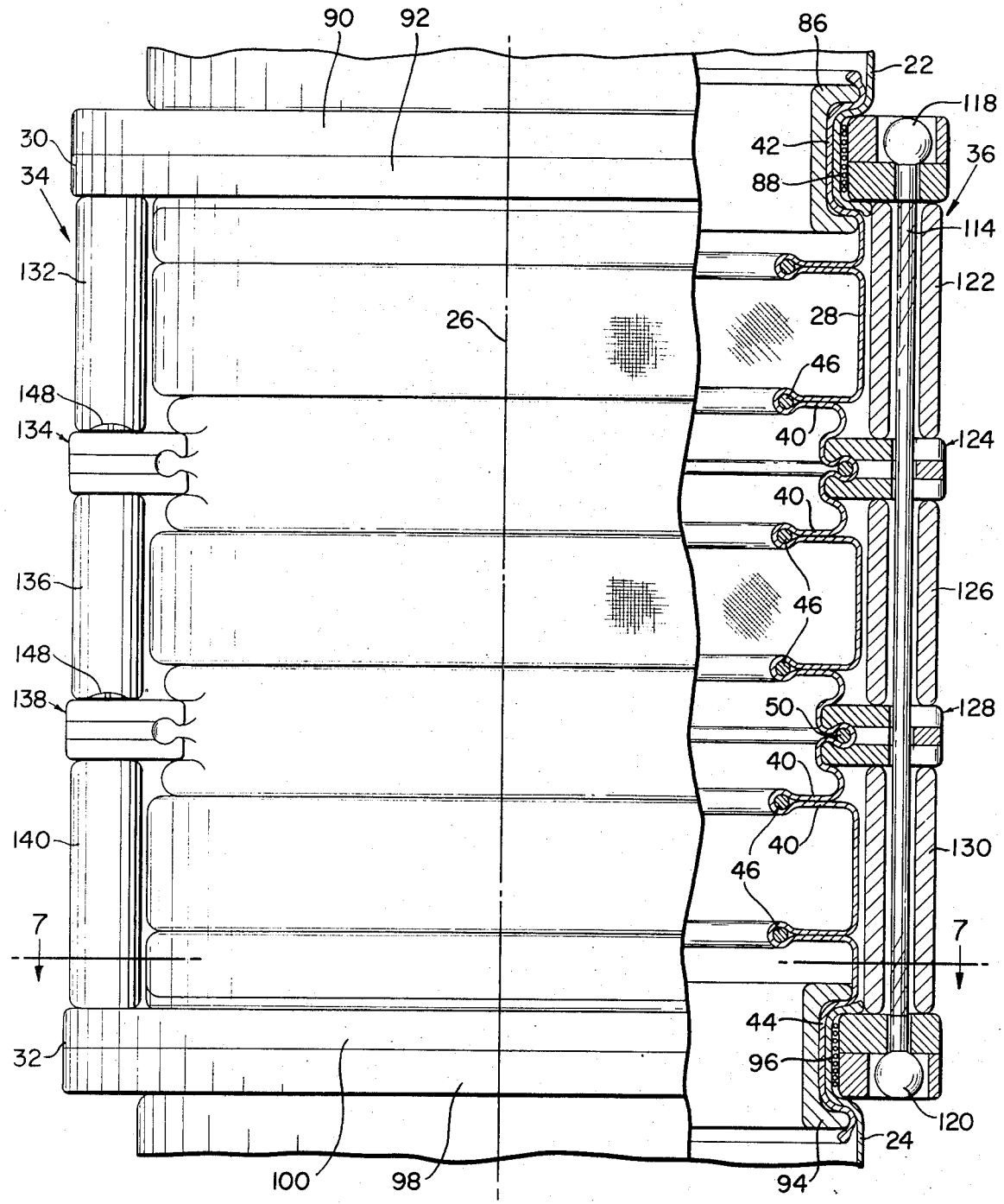
FIG. 6, is a front elevation view, partially broken-away, showing a joint assembly according to the invention.
Figure 7:
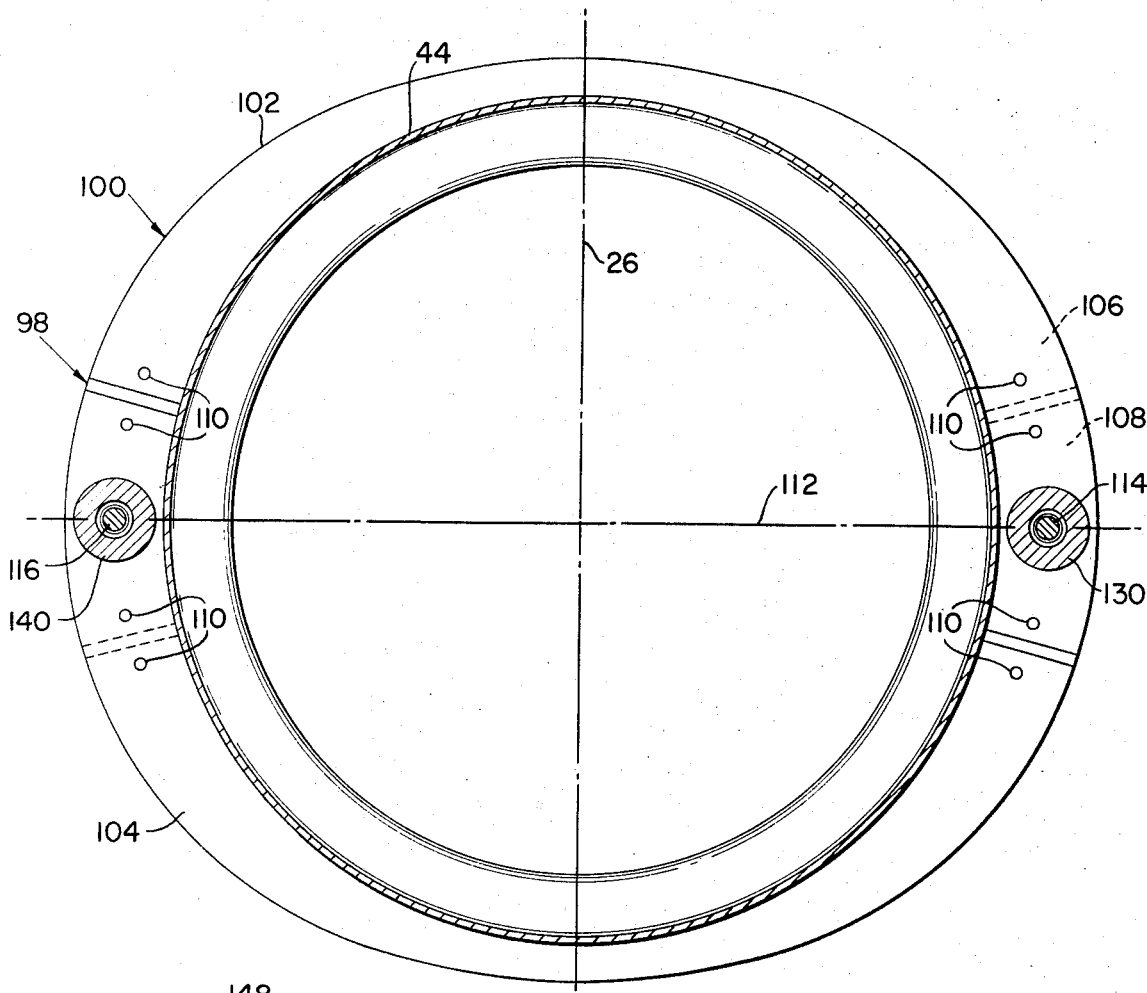
FIG. 7, is a plan view taken on the line 7—7 of FIG. 6.

The integration of the convoluted member 28 of FIGS. 3 and 4 into the joint 20 of FIGS. 1 and 2 is illustrated in detail in FIGS. 6 and 7. The upper end portion 42 of the member 28 is disposed over and within the channel of ring element 86 with the lower end of upper leg enclosure member 22 overlying and cemented to the portion 42. A serving layer of several turns of thread 88 is provided to retain the member fabrics prior to the installation of the split rings 90 and 92. Likewise, the lower end portion 44 of the member 28 is disposed over and within the channel of the ring element 94 with the upper end of the lower leg enclosure member 24 overlying and cemented to the portion 44. A serving layer of several turns of thread 96 retains the parts together for installation of the split rings 98 and 100 which are identical to rings 90 and 92 respectively.

As shown in FIG. 7, ring 100 is comprised of half rings 102 and 104 while ring 98 is comprised of half rings 106 and 108, a structural arrangement which will be recognized by those skilled in the art as enabling the assembly of the rings 98 and 100 over the serving thread 96 within the confines of the channel of the ring 94. After assembling the half rings in this relationship, the parts may be secured together by pins 110 received within small pre-drilled holes in each of the rings. As will be apparent, any preferred fastening means may be utilized to secure the four rings together after assembly over the serving thread 96. Likewise, split rings 90 and 92 are assembled and secured in the same fashion.

At diametrically opposite points in the plane 112 of axial restraint (FIG. 7), the split rings 90, 92, 98 and 100 are bored to receive axial restraint cables, as best seen in FIG. 6. For example, the cable 114 on the right hand side, and a cable 116 (FIG. 7) on the left hand side, are each disposed through bores in the rings 90, 92, 98 and 100 with the enlarged bores in rings 90 and 98 permitting the reception of ball and shank elements 118 and 120, which are swaged on the ends of the cable 114 in a manner well known to those skilled in the art. Cable 116 is likewise provided with similar ball and shank elements (not shown), also disposed in enlarged bores of rings 90 and 98.

Disposed over the cable 114 along its length between the rings 92 and 100, in respective order, are a first tubular spacer 122, a first cable guide 124, a second tubular spacer 126, a second cable guide 128 and a third tubular spacer 130. Similarly, disposed over the cable 116 along its length between the rings 92 and 100, in respective order, are a first spacer 132, a first cable guide 134, a second spacer 136, a second cable guide 138 and a third spacer 140.

From the structural arrangement disclosed, it is seen that combinations of the cables, spacers and guides, together with the rings, serve to maintain the convolutions of the convoluted member 28 in a predetermined axial disposition while at the same time permitting flexion of the member 28, in the flexure plane 26.

Figure 8:
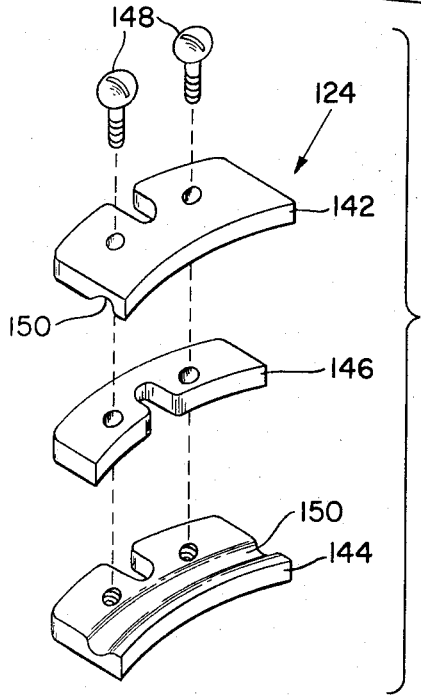
FIG. 8, is a perspective view of one of the cable guides which form a part of the axial restraint assemblies.

The cable guides 124, 128, 134 and 138 are all identical, and as best seen in FIG. 8, each comprise a pair of plates 142 and 144 separated by a shim 146, screws 148 or other means serving to retain the guides in assembled relation. The plates are identical and define arcuately grooved surfaces 150 adapted to overlie the peripheral fabric portion of the convolution for a short distance each side of the axial restraint plane 112 and to grasp and retain the fabric and the compression rings 50 substantially midway between the radially directed folded fabric portion 40. Thus, the cables 114 and 116 and the guides 124, 138, 134 and 138, which are effectively secured to alternate fabric convolutions on their peripheral portions, serve to exercise control over the convolutions to prevent them from snaking out of constant volume constraint when the joint is flexed. It will be noted that absent such constraint, if the convolutions were to snake out upon flexion of the joint the joint volume would increase, with a consequent requirement of increased effort to return the convolutions to proper axial position upon retracting the joint to neutral extension.

Figure 9:
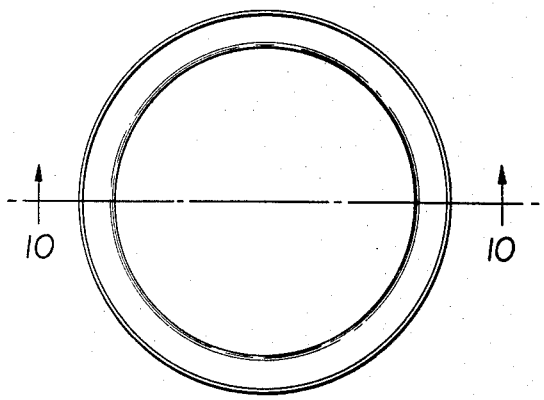
FIG. 9, is a schematic plan view in section of an unflexed joint.
Figure 11:
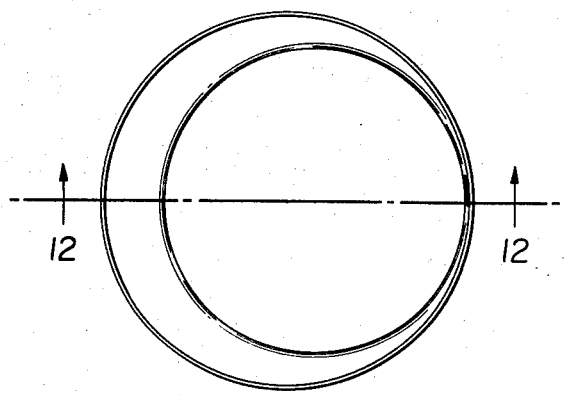
FIG. 11, is a schematic plan view illustrating the joint of FIG. 9 in flexed position.
Figure 10:
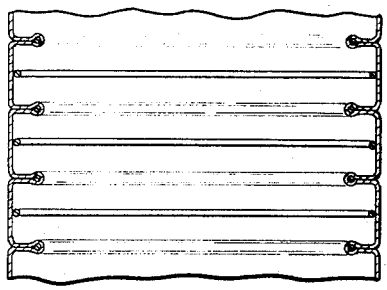
FIG. 10, is a schematic elevation view, taken on the line 10—10 of FIG. 9, illustrating a constant volume joint in neutral position.
Figure 12:
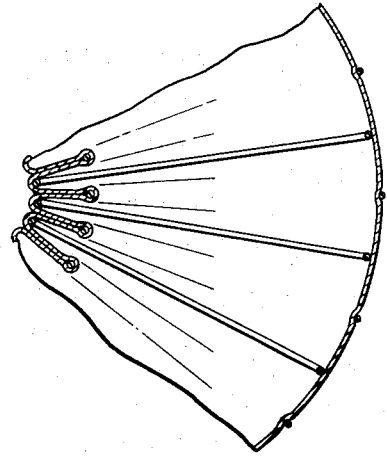
FIG. 12, is a schematic elevation view taken on the line 12—12 of FIG. 11.

FIGS. 9, 10, 11 and 12, which are schematic in form, illustrate the operation of the joint at full neutral extension and full flexion positions. In FIGS. 9 and 10, cross-sectional plan and elevation views schematically illustrate the constant volume joint of the present invention in the neutral position of extension. In FIGS. 11 and 12, the same schematic joint is illustrated in substantially maximum flexion, and it is now clear that the constant volume requirement is met substantially by the migration of the fabric through a relatively sharp radius from and to the fold portions and to and from the peripheral portions. The fabric migration is effectively accomplished with the structural arrangement including the configuration of the convolutes and the various restraints imposed on those convolutes individually and as a working group, all as described in detail hereinabove.

As was mentioned hereinabove, the arrangement of the flexible restraint cables on the exterior of the joint provides a distinct improvement over the interiorly disposed arrangement of the prior art. In the latter case, where the cables are attached to one or several of the convolutions at their minor diameter folds, the joint tends to act as a conventional pressurized spring bellows. In the present invention, the exterior restraints permit the disclosed configuration of the convolutions such that when the joint is flexed it partakes of substantially the characteristics of a flexible segment of a toroid, hence more nearly approaches the ideal of a constant volume joint.

We claim:

1. A pressurizable garment member comprising:
a plurality of elongate fabric strips joined edge to edge in overlapping relationship to form a generally axially disposed first fabric tubular element, and
a second fabric tubular element, one of said elements being layered within the other with a pressure sealant bonding agent therebetween, the fabric lay of one of said tubular elements being straight cut along the axis of said member.

2. A member according to claim 1 in which:
the fabric lay of the other said tubular elements is bias cut.

3. A member according to claim 2 in which:
said second element is disposed within said first element.

4. A member according to claim 1 in which:
the fill threads of said straight cut fabric layer element are substantially parallel to the axis of said member with the warp threads extending between said joint edges.

5. A member according to claim 1 in which:
said second fabric element is formed of a plurality of elongate fabric strips joined edge to edge in overlapping relationship.

6. A generally tubular member for a pressurizable garment comprising:
a first fabric layer having a straight cut fabric lay relative to the axis of said tubular member, and
a second fabric layer having a bias cut fabric lay,
said layers being bonded together by a pressure sealant therebetween.

7. A member according to claim 6 in which:
said first fabric layer is the outer one, and
the second fabric layer is the inner one of said member.

8. A member according to claim 6 in which:
one of said layers is comprised of a plurality of elongate fabric strips joined edge to edge in overlapping relationship with the edge joints extending axially of said member.

9. A member according to claim 8 in which:
the other of said layers is comprised of a plurality of elongate fabric strips joined edge to edge in overlapping relationship with the edge joints extending axially of said member.

10. A substantially constant volume joint for a pressurizable garment;
said joint being of generally tubular configuration about an axis and adapted to low torque flexion and extension through an angle in a flexure plane including said axis,
said joint comprising a convoluted fabric member disposed about said axis,
said convoluted member comprising peripheral and folded portions intermediate said peripheral portions,
said peripheral fabric portions extending substantially axially on a major diameter of said member, said intermediate folded fabric portions extending substantially radially inwardly from said peripheral portions to a minor diameter of said member,
said convoluted member further comprising a first ring-like member adapted to sustain a stress in tension, disposed within said folded portions, and means retaining said ring-like member substantially at points in said flexure plane at said minor diameter, said ring-like member being otherwise unrestrained against movement relative to said folded portions, said convoluted member further comprising a second ring-like member adapted to sustain a stress in compression, disposed within one of said peripheral portions.

11. A joint according to claim 10 in which:
said first ring-like member is comprised of a plastic fiber cord.

12. A joint according to claim 11 in which:
said convoluted member further comprises a substantially low friction medium disposed between said cord and the fabric of said folded portions.

13. A joint according to claim 12 in which:
said low friction medium comprises a thin plastic tube within which first ring-like member is disposed.

14. A joint according to claim 13 in which:
said plastic tube is comprised of a polytetrafuoroethylene.

15. A joint according to claim 10 in which:
said second ring-like member is fixedly disposed substantially mid-way between successive inwardly directed folded portions of said convoluted member.

* * * * *